US011410681B2

(12) United States Patent
Liu

(10) Patent No.: US 11,410,681 B2
(45) Date of Patent: Aug. 9, 2022

(54) SYSTEM AND METHOD OF DETERMINING IF AN INFORMATION HANDLING SYSTEM PRODUCES ONE OR MORE AUDIO GLITCHES

(71) Applicant: Dell Products L.P., Round Rock, TX (US)

(72) Inventor: Chung-Hung Liu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 16/806,139

(22) Filed: Mar. 2, 2020

(65) Prior Publication Data

US 2021/0272583 A1 Sep. 2, 2021

(51) Int. Cl.
*G10L 25/60* (2013.01)
*G10L 25/30* (2013.01)
*G06N 3/08* (2006.01)
*G06N 3/04* (2006.01)

(52) U.S. Cl.
CPC ............ *G10L 25/60* (2013.01); *G06N 3/04* (2013.01); *G06N 3/084* (2013.01); *G10L 25/30* (2013.01)

(58) Field of Classification Search
CPC ............ G06F 17/18; G06F 2207/4824; G06F 11/1476; G06F 2201/81; G10L 25/30; G10L 15/16; G10L 21/0208; G10L 25/78; G10L 21/02; G10L 17/26; G10L 21/0216; G10L 25/18; G10L 2021/02087; G10L 21/028; G10L 25/60; G10L 15/24; G10L 2021/02082; G10L 15/14; G10L 15/148; G10L 17/18; G10L 19/00; G10L 19/012; G10L 19/26; G10L 19/265; G10L 2025/783; G06N 3/04; G06N 3/084; G06N 3/0454

See application file for complete search history.

(56) References Cited

U.S. PATENT DOCUMENTS

| 10,709,353 | B1 * | 7/2020 | McLane | A61B 5/7267 |
| 11,227,626 | B1 * | 1/2022 | Krishnan Gorumkonda | G06F 3/167 |
| 2017/0200092 | A1 * | 7/2017 | Kisilev | G06K 9/6274 |
| 2018/0165543 | A1 * | 6/2018 | Mody | G06V 10/454 |
| 2019/0324117 | A1 * | 10/2019 | Lin | G01S 3/808 |

OTHER PUBLICATIONS

M. T. Hagan et al. "Neural Network Design." *Pws, Boston* (2014).

* cited by examiner

*Primary Examiner* — Linda Wong
(74) *Attorney, Agent, or Firm* — Baker Botts L.L.P.

(57) ABSTRACT

In one or more embodiments, one or more system, methods, and/or processes may determine, based at least on the user responses from users that listen to audio files, first portions of the audio files that include at least one audio glitch and second portions of the audio files that do not include the at least one audio glitch; may determine values of a filter, of a convolution neural network (CNN), based at least on the first portions and the second portions of the audio files; may provide audio produced by an information handling system (IHS) to the CNN; may determine, based at least on data from convolving the audio produced by the IHS with the filter and output data from the CNN, if the IHS has produced an audio glitch; and may provide information indicating whether or not the IHS has produced the audio glitch.

19 Claims, 10 Drawing Sheets

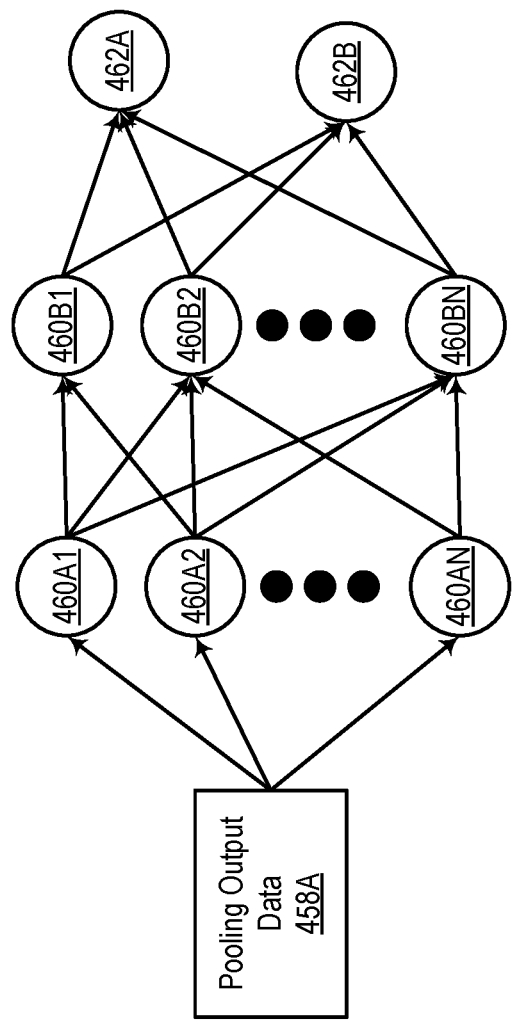

SYSTEM AND METHOD OF DETERMINING IF AN INFORMATION HANDLING SYSTEM PRODUCES ONE OR MORE AUDIO GLITCHES

BACKGROUND

Field of the Disclosure

This disclosure relates generally to information handling systems and more particularly to determining if an information handling system produces one or more audio glitches.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Occasionally, negative feedback from users of information handling systems can be received. The negative feedback can be based on intermittent audio errors. For example, intermittent audio errors can be experienced while an information handling system is outputting audio. For instance, multimedia may output audio. Even though an information handling system can be tested by a person, audio errors may not be identified due to loud background noise in factory or fatigue of the person, among others.

SUMMARY

In one or more embodiments, one or more systems, one or more methods, and/or one or more processes may provide, to multiple users, multiple audio files, wherein at least a first audio file of the multiple audio files includes at least one audio glitch and at least a second of audio file of the multiple audio files does not include any audio glitch; may receive multiple user responses from the multiple users that listen to the multiple audio files; may determine, based at least on the multiple user responses, first multiple portions of the multiple audio files that include at least one audio glitch; may determine, based at least on the multiple user responses, second multiple portions of the multiple audio files that do not include the at least one audio glitch; may initialize values of a filter of a convolution neural network for detecting at least one pattern associated with the at least one audio glitch; may determine values of the filter based at least on the first multiple portions of the multiple audio files that include the at least one audio glitch and the second multiple portions of the multiple audio files; may receive audio produced by an information handling system; may provide the audio produced by the information handling system to the convolution neural network; may convolve the audio produced by the information handling system with the filter; may determine, based at least on data from convolving the audio produced by the information handling system with the filter and output data from the convolution neural network, if the information handling system has produced one or more audio glitches; if the information handling system has produced one or more audio glitches, may provide information indicating that the information handling system has produced the one or more audio glitches; and if the information handling system has not produced one or more audio glitches, may provide information indicating that the information handling system has not produced the one or more audio glitches.

In one or more embodiments, the one or more systems, the one or more methods, and/or the one or more processes may further perform a pooling operation on the data from convolving the audio produced by the information handling system with the filter. For example, determining, based at least on the data from convolving the audio produced by the information handling system with the filter and the output data from the convolution neural network, if the information handling system has produced the one or more audio glitches may include determining, based at least on output data form the pooling operation and the output data from the convolution neural network, if the information handling system has produced the one or more audio glitches. For instance, the pooling operation may include a max pooling operation, a min pooling operation, or an average pooling operation.

In one or more embodiments, the one or more systems, the one or more methods, and/or the one or more processes may further determine one or more of weights and biases of the convolution neural network. For example, the output data from the convolution neural network may be based at least on the one or more of weights and biases of the convolution neural network. In one or more embodiments, determining the one or more of weights and biases of the convolution neural network may include determining the one or more of weights and biases of the convolution neural network via a gradient descent process or a backwards propagation process.

In one or more embodiments, the filter may be configured to determine the at least one pattern that includes a change in magnitude of sound that is above a threshold in a period of time, which indicates at least one of the one or more audio glitches. In one or more embodiments, the at least one audio glitch may include a first audio glitch. For example, determining if the information handling system has produced the one or more audio glitches may include determining, via the convolution neural network, that the audio produced by the information handling system includes a second audio glitch, different from the first audio glitch.

In one or more embodiments, the one or more systems, the one or more methods, and/or the one or more processes may produce audio output; may provide the audio output to a convolution neural network, stored by a memory medium, trained to determine if an information handling system has produced one or more audio glitches; may convolve the audio output with a first filter of the convolution neural network to produce first convolved audio output data; may provide data based at least on the first convolved audio output data to a fully connected neural network of the convolution neural network; may determine, based at least on output from the fully connected neural network, if the information handling system produces the one or more audio glitches; if the information handling system has produced one or more audio glitches, may provide information indicating that the information handling system has produced the one or more audio glitches; and if the information handling system has not produced one or more audio glitches, may provide information indicating that the information handling system has not produced the one or more audio glitches.

In one or more embodiments, the one or more systems, the one or more methods, and/or the one or more processes may further perform a max pooling operation on the first convolved audio output data. In one or more embodiments, providing the data based at least on the first convolved audio output data to the fully connected neural network of the convolution neural network may include providing data from the max pooling operation to the fully connected neural network of the convolution neural network. In one or more embodiments, the filter may be configured to determine that a change in magnitude of sounds is above a threshold in a period of time.

In one or more embodiments, determining, based at least on output from the fully connected neural network, if the information handling system has produced one or more audio glitches may include determining if an output value of the fully connected neural network is at or above a threshold value. In one or more embodiments, the one or more systems, the one or more methods, and/or the one or more processes may further perform a first pooling operation on the first convolved audio output data; and may further convolve output from the first pooling operation with a second filter to produce second convolved output data. For example, the data based at least on the first convolved audio output data may be further based on the second convolved output data. In one or more embodiments, the one or more methods, and/or the one or more processes may further perform a second pooling operation on the second convolved output data. For example, the data based at least on the first convolved audio output data may be further based on output from the second pooling operation.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 4C illustrates an example of a convolution, according to one or more embodiments;

FIG. 4D illustrates an example of pooling and providing pooling output data to a fully connected neural network, according to one or more embodiments;

DETAILED DESCRIPTION

Figure 1:
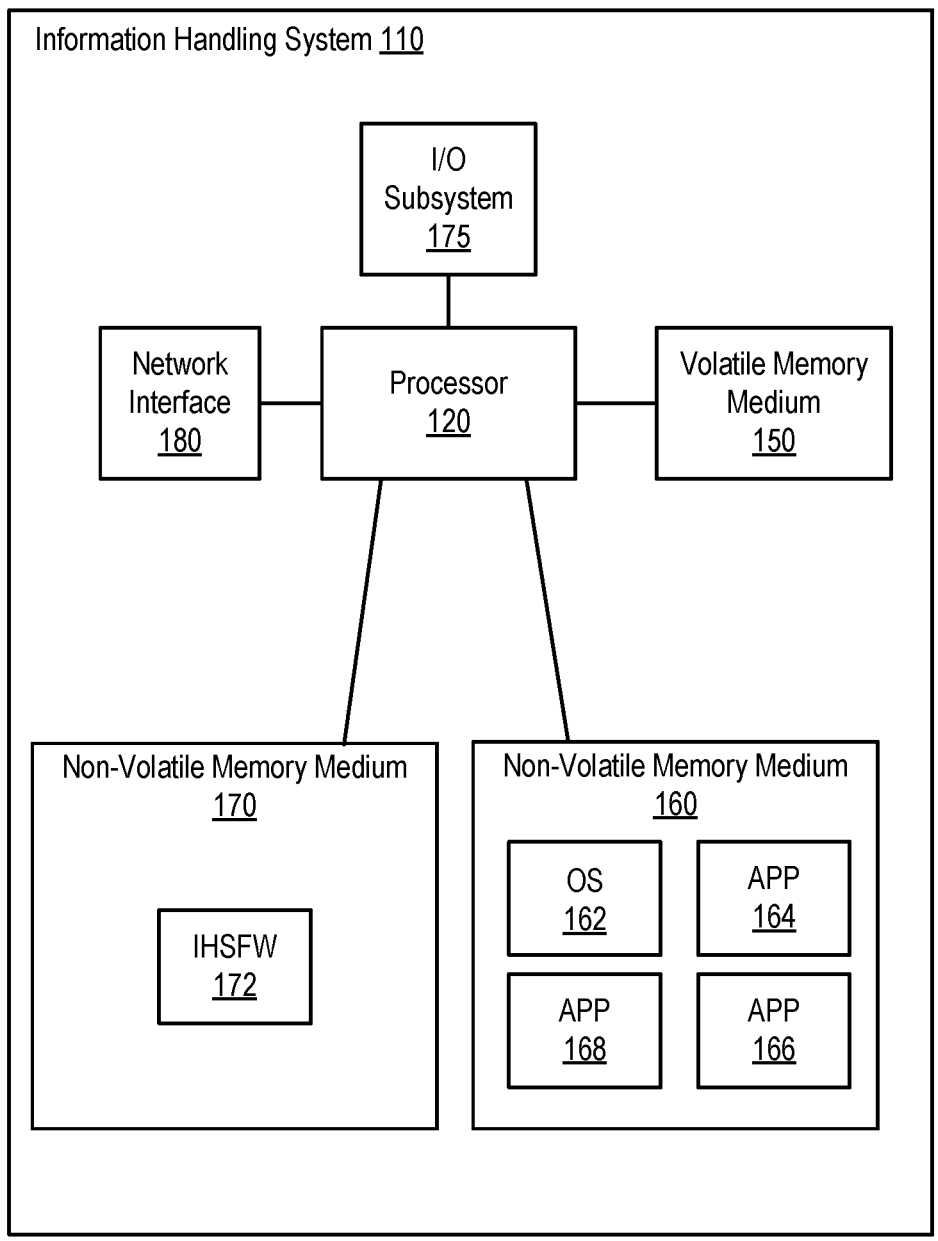
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a user may experience an audio glitch while listening to audio from an information handling system. For example, an audio glitch may include an error in producing the audio from the information handling system. For instance, there may be one or more issues associated with audio circuitry of the information handling system that may cause one or more audio glitches.

In one or more embodiments, audio from an information handling system may be tested at a factory. For example, an employee may test the audio from the information handling system. In one instance, there may be outside noise that may prevent the employee from accurately testing the audio from the information handling system. In another instance, the employee may become distracted from time to time, which may prevent the employee from accurately testing the audio from the information handling system. In one or more embodiments, a human tester may not be able to carefully listen to audio for an extended period of time. In one or more embodiments, programming an information handling system to determine if a glitch has occurred may be difficult or problematic. For example, it may be problematic to programming the information handling system to determine if a glitch has occurred if the glitch has not occurred before in the audio of the information handling system.

In one or more embodiments, multiple audio files may be produced. For example, some of the multiple audio files may be produced to include one or more audio glitches. In one or more embodiments, multiple people may listen to the multiple audio files. For example, user input from the multiple people may indicate if an audio file of the multiple audio files includes an audio glitch. For instance, one or more patterns may be determined based at least on the user input from the multiple people indicating if an audio file of the multiple audio files includes an audio glitch.

In one or more embodiments, an artificial intelligence (AI) may be trained based at least on the user input from the multiple people indicting if an audio file of the multiple audio files includes an audio glitch to determine one or more patterns of one or more audio glitches. For example, if it is determined that an audio file includes an audio glitch, the AI may analyze data of the audio file and may determine one or more patterns associated with the audio glitch. In one or more embodiments, the AI may include a neural network. For example, the neural network may include a convolution neural network (CNN). In one or more embodiments, a CNN may include an input layer and an output layer. In one or more embodiments, a CNN may include multiple hidden layers. For example, the multiple hidden layers may be or include a fully connected neural network. In one or more embodiments, the CNN may include an output layer. For example, a perceptron of the output layer may output a confidence value. For instance, the confidence value may be utilized in determining if an information handling system produces one or more audio glitches. In one or more embodiments, an application of the information handling system may be utilized by a user. For example, if the user believes that the information handling system may be malfunctioning, the user may utilize the application to determine if the information handling system produces one or more audio glitches.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RANI (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
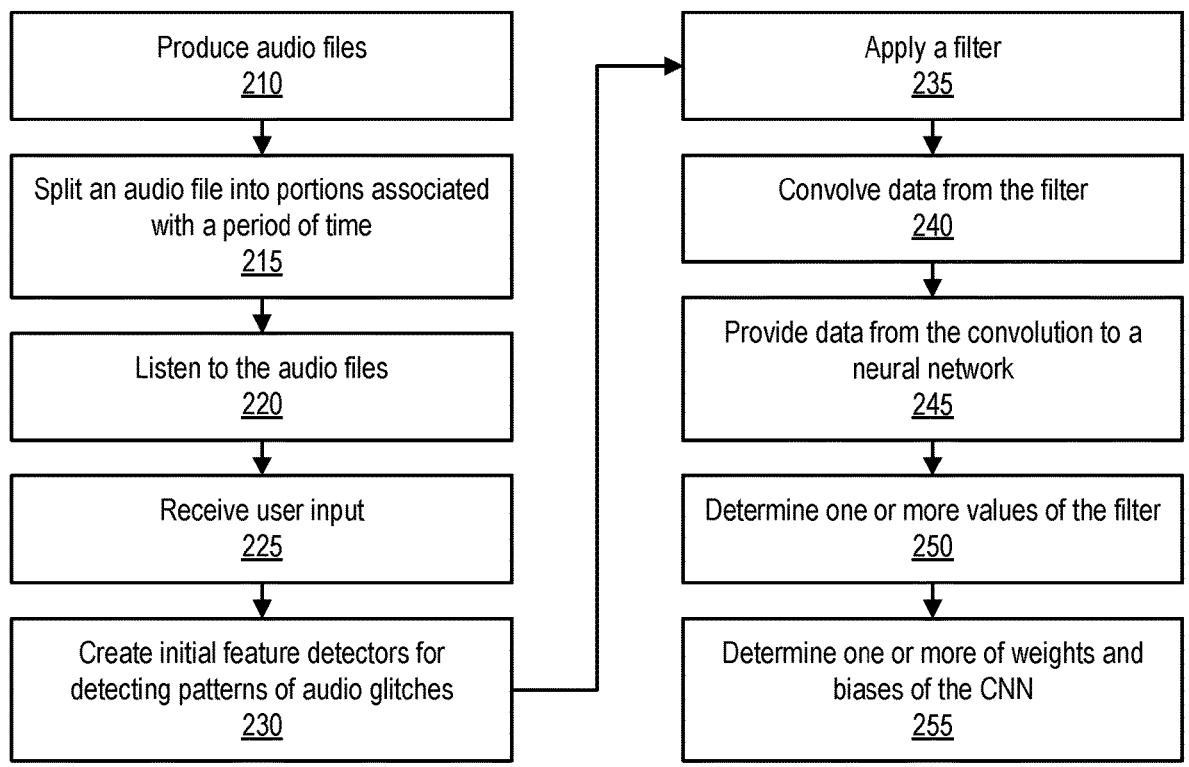
FIG. 2 illustrates an example of a method of training a convolution neural network, according to one or more embodiments.
Figure 4A:
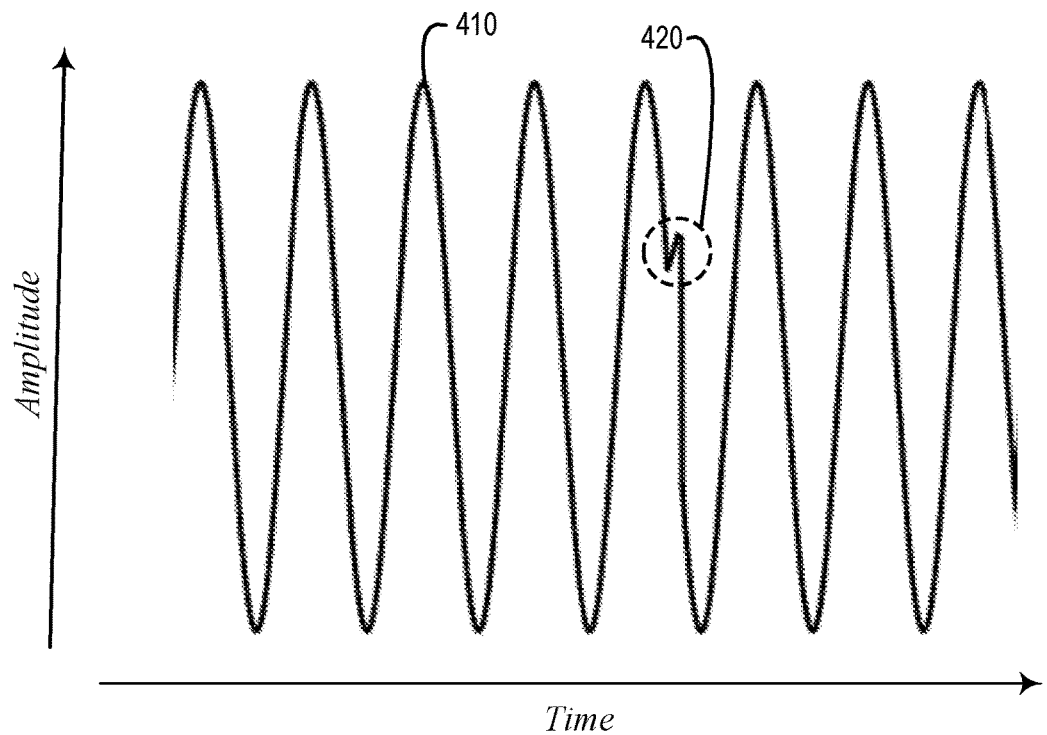
FIG. 4A illustrates an example of audio and an audio glitch, according to one or more embodiments.

Turning now to FIG. 2, an example of a method of training a convolution neural network is illustrated, according to one or more embodiments. At 210, audio files may be produced. In one example, some of the audio files may include one or more audio glitches. In another example, some of the audio files may not include an audio glitch. In one or more embodiments, producing an audio file that includes an audio glitch may include modifying an audio file to include the audio glitch. For example, a sound 410 may be modified with an audio glitch 420, as illustrated in FIG. 4A. For instance, sound 410 may include a sine wave. As one example, producing an audio file that includes an audio glitch may include adding the audio glitch to the audio file. As another example, producing an audio file that includes an audio glitch may include corrupting a portion of the data of the audio file.

Figure 4B:
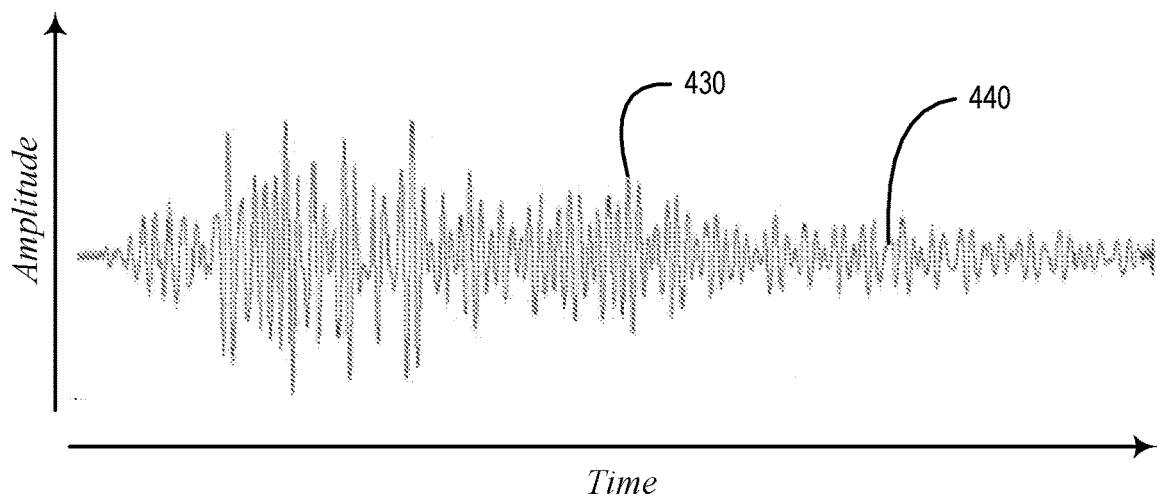
FIG. 4B illustrates another example of audio and an audio glitch, according to one or more embodiments.

At 215, an audio file may be split into portions associated with a period of time. In one or more embodiments, the portion of time may be one second. For example, the audio file may be split into one second portions. For instance, a one second portion 430 of the audio file is illustrated in FIG. 4B. In one or more embodiments, other periods of time may be utilized. At 220, one or more people may listen to the audio files. For example, the one or more people may listen to the portions of each of the audio files.

At 225, user input may be received. In one or more embodiments, the user input may be received from the one or more people that listen to the audio files. In one example, the user input may indicate that an audio file includes an audio glitch. For instance, the user input may indicate that a portion of an audio file includes an audio glitch (e.g., an audio glitch 440). In another example, the user input may indicate that an audio file does not include an audio glitch. In one or more embodiments, the user input may be received via a user interface. For example, the user interface may include a graphical user interface (GUI). For instance, the GUI may include a webpage. In one or more embodiments, the webpage may be provided to respective one or more web browsers of the one or more people.

In one or more embodiments, one or more people may include multiple people. In one example, a first person of the multiple people may not indicate that an audio file includes an audio glitch. In another example, a second person of the multiple people and a third person of the multiple people may indicate that the audio file includes the audio glitch. In one instance, determining if the audio file includes the glitch may include a majority voting scheme from the user input. In another instance, determining if the audio file includes the glitch may include a plurality voting scheme from the user input. In one or more embodiments, determining if the audio file includes the glitch may include determining if a count of the multiple people that indicate that the audio file includes the glitch may include determining if the count exceeds a threshold number.

At 230, initial feature detectors for detecting patterns of audio glitches may be created. In one or more embodiments, a CNN may be initialized with initial weights. For example, each weight $w_{ij}$ of the CNN may be set to an initial value. For instance, a weight $w_{ij}$ of the CNN may be associated with a perceptron $p_{ij}$ of the CNN. In one or more embodiments, at least a first weight of the CNN and a second weight of the CNN may be set to different initial values. In one or more embodiments, at least a first weight of the CNN and a second weight of the CNN may be set to same or equal initial values. In one or more embodiments, the CNN may be initialized with initial biases. For example, each bias $b_{ij}$ of the CNN may be set to an initial value. For instance, a bias $b_{ij}$ of the CNN may be associated with a perceptron $p_{ij}$ of the CNN. In one or more embodiments, a perceptron may include an artificial neuron. In one or more embodiments, at least a first bias of the CNN and a second bias of the CNN may be set to different initial values. In one or more embodiments, at least a first bias of the CNN and a second bias of the CNN may be set to same or equal initial values. In one or more embodiments, a perceptron p may be:

$$p = f(\vec{i} \cdot \vec{w}) + b,$$

where $\vec{i}$ is a vector of input values, $\vec{w}$ is a vector of weight values, and b is a bias value.

At 235, a filter may be applied. In one or more embodiments, a filter may be utilized to determine that a change in frequency is above a threshold. In one or more embodiments, a filter may be utilized to determine that a change in magnitude of sounds is above a threshold. In one or more embodiments, a filter may be utilized to determine that a change in magnitude of sounds is below a threshold. In one or more embodiments, a filter may be referred to as a kernel.

At 240, data from the filter may be convolved. For example, a convolution operation may be applied to the data from the filter. In one instance, the convolution operation may be applied without padding. In another instance, the convolution operation may be applied with padding. In one or more embodiments, the convolution operation may be applied with striding. For example, a stride may be one, two, three, or more. In one or more embodiments, the convolution operation may be applied to multiple channels. For example, the convolution operation may reduce a volume to an area. For instance, the convolution operation may be applied to a left channel of stereo data and a right channel of the stereo data. In one or more embodiments, convolving data with a filter may be advantageous. For example, the filter may include a feature detector. For instance, the feature detector that may be useful in a first portion of the data may be useful in a second portion of the data.

At 245, data from the convolution may be provided to a neural network. For example, the CNN may include the neural network. For instance, the neural network may a fully connected neural network. At 250, one or more values of the filter may be determined. For example, the one or more of the values of the filter of the CNN may be determined based at least on the user input. In one instance, the values of the filter of the CNN may be determined via a gradient descent process. In a second instance, the values of the filter of the CNN may be determined via a gradient descent with momentum process. In another instance, the values of the filter of the CNN may be determined via a backwards propagation process.

At 255, one or more of weights and biases of the CNN may be determined. For example, the one or more of the weights and the biases of the CNN may be determined based at least on the user input. In one instance, the one or more of the weights and the biases of the CNN may be determined via a gradient descent process. In a second instance, the one or more of the weights and the biases of the CNN may be determined via a gradient descent with momentum process. In another instance, the one or more of the weights and the biases of the CNN may be determined via a backwards propagation process.

Figure 3:
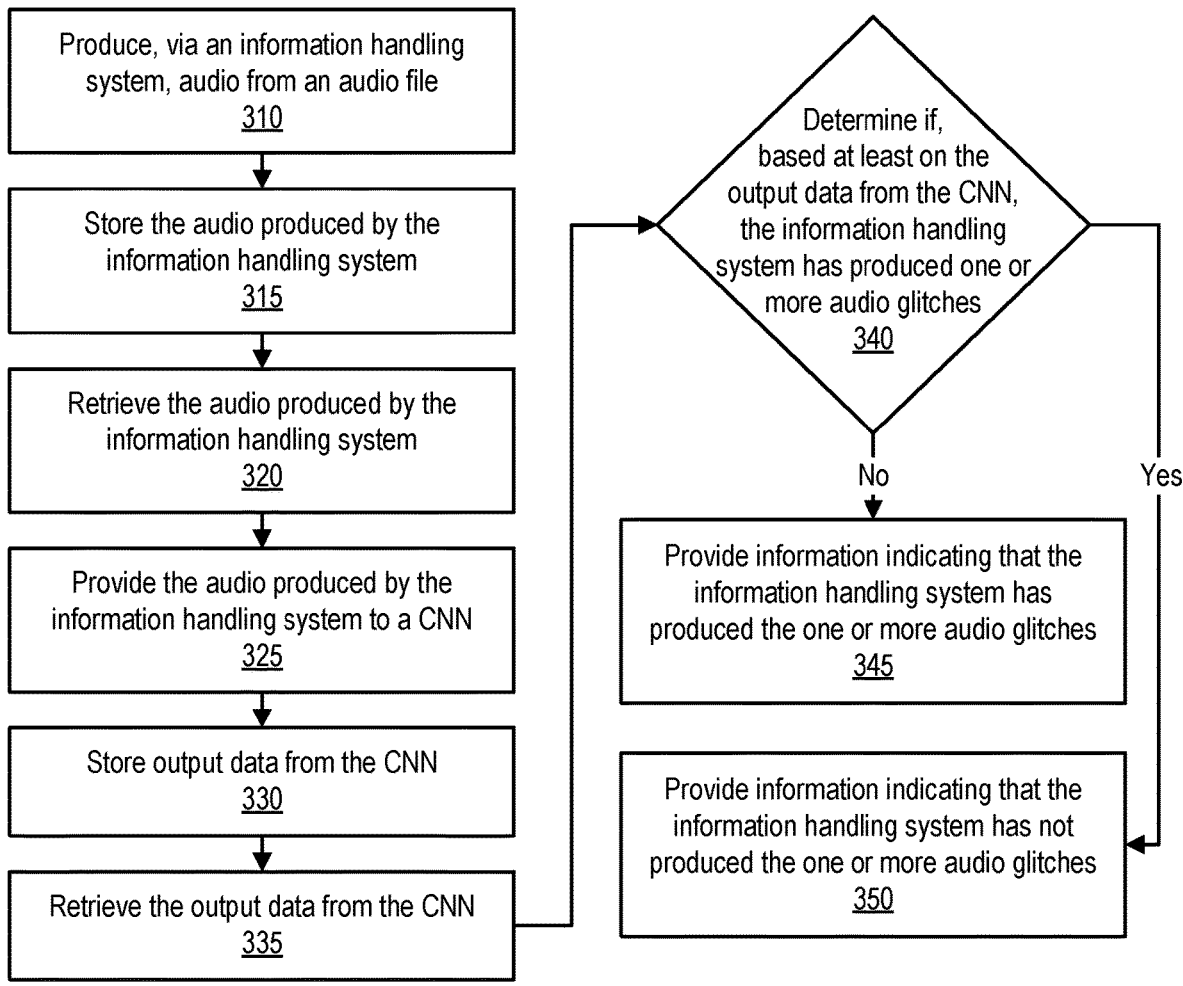
FIG. 3 illustrates an example of determining if an information handling system produces one or more audio glitches, according to one or more embodiments.

Turning now to FIG. 3, an example of determining if an information handling system produces one or more audio glitches is illustrated, according to one or more embodiments. At 310, an information handling system may produce audio from an audio file. In one example, the audio produced by the information handling system may include analog audio. In another example, the audio produced by the information handling system may include digital audio. In one or more embodiments, a benchmark application executed by the information handling system may cause the information handling system to produce audio from an audio file. For example, the audio file may not include an audio glitch.

In one or more embodiments, the audio produced by the information handling system may include analog audio. In one or more embodiments, the audio produced by the information handling system may include digital audio. For example, the audio produced by the information handling system may include a raw audio format. In one instance, the raw audio format may include uncompress audio. In a second instance, the raw audio format may include one or more of pulse code modulation (PCM) data, IEEE 754 data, and ASCII data, among others. In another instance, the raw audio format may not include any header information (e.g., bit depth, a number of channels, endianness, sampling rate, etc.). In one or more embodiments, the audio produced by the information handling system may include an array of numbers. For example, for a period of time, the audio produced by the information handling system may include an array of N numbers. For instance, each number in the array of N number may include a range of 0.0 to 1.0. In one or more embodiments, each number in the array of N number may include a resolution. In one example, the resolution may be 0.01. In another example, the resolution may be 0.001.

At 315, the audio produced by the information handling system may be stored. In one example, the audio produced by the information handling system may be stored via a memory medium of the information handling system. In another example, the audio produced by the information handling system may be stored via a network coupled to the information handling system. In one instance, storing the audio produced by the information handling system via the network may include storing the audio produced by the information handling system via another information handling system coupled to the network. In another instance, storing the audio produced by the information handling system via the network may include storing the audio produced by the information handling system via a memory medium coupled to the network.

At 320, the audio produced by the information handling system may be retrieved. For example, the audio produced by the information handling system may be stored via a file, and the file may be retrieved. At 325, the audio produced by the information handling system may be provided to a CNN. For example, the audio produced by the information handling system may be provided to the CNN trained via the method illustrated in FIG. 2.

At 330, output data from the CNN may be stored. In one example, the output data from the CNN may be stored via a memory medium of the information handling system. In another example, the output data from the CNN may be stored via a network coupled to the information handling system. In one instance, storing the output data from the CNN via the network may include storing the output data from the CNN via another information handling system coupled to the network. In another instance, storing the output data from the CNN via the network may include storing the output data from the CNN via a memory medium coupled to the network. In one or more embodiments, the output data from the CNN may include a number that indicates a confidence value that the audio produced by the information handling system has an audio glitch. In one or more embodiments, the output data from the CNN may include a number that indicates a confidence value that the audio produced by the information handling system does not have an audio glitch.

At 335, the output data from the CNN may be retrieved. At 340, it may be determined, based at least on the output data from the CNN, if the information handling system has produced one or more audio glitches. If the information handling system has produced one or more audio glitches, information indicating that the information handling system has produced the one or more audio glitches may be provided, at 345. In one or more embodiments, providing the information indicating that the information handling system has produced the one or more audio glitches may include providing the information indicating that the information handling system has produced the one or more audio glitches via a display. In one or more embodiments, providing the information indicating that the information handling system has produced the one or more audio glitches may include providing the information indicating that the information handling system has produced the one or more audio glitches via a printer.

In one or more embodiments, providing the information indicating that the information handling system has produced the one or more audio glitches may include providing the information indicating that the information handling system has produced the one or more audio glitches to another information handling system. For example, providing the information indicating that the information handling system has produced the one or more audio glitches to the other information handling system may include providing the information indicating that the information handling system has produced the one or more audio glitches to the other information handling system via a network.

If the information handling system has not produced one or more audio glitches, information indicating that the information handling system has not produced an audio glitch may be provided, at 350. In one or more embodiments, providing the information indicating that the information handling system has not produced the one or more audio glitches may include providing the information indicating that the information handling system has not produced the one or more audio glitches via a display.

In one or more embodiments, providing the information indicating that the information handling system has not produced the one or more audio glitches may include providing the information indicating that the information handling system has not produced the one or more audio glitches via a printer. In one or more embodiments, providing the information indicating that the information handling system has not produced the one or more audio glitches may include providing the information indicating that the information handling system has not produced the one or more audio glitches to another information handling system. For example, providing the information indicating that the information handling system has not produced the one or more audio glitches to the other information handling system may include providing the information indicating that the information handling system has not produced the one or more audio glitches to the other information handling system via a network.

Turning now to FIG. 4C, an example of a convolution is illustrated, according to one or more embodiments. As shown, an audio sample 450 may be convolved with a filter 452A. In one or more embodiments, audio sample 450 convolved with filter 452A may produce convolution output data 454A.

Turning now to FIG. 4D, an example of pooling and providing pooling output data to a fully connected neural network is illustrated, according to one or more embodiments. As shown, a pooling operation 456A of convolution output data 454A may produce pooling output data 458A. As illustrated, pooling output data 458A may be provided to perceptrons 460A1-460AN. For example, a first hidden layer may include perceptrons 460A1-460AN. In one or more embodiments, pooling output data 458A may include a vector. For example, the vector may be provided to perceptrons 460A1-460AN. For instance, the vector may be provided to each perceptron 460A of perceptrons 460A1-460AN. In one or more embodiments, pooling operation 456A may include a max pooling operation, a min pooling operation, or an average pooling operation, among others.

As shown, output data from perceptrons 460A1-460AN may be provided to perceptrons 460B1-460BN. For example, each perceptron 460A of perceptrons 460A1-460AN may provide its output data to each perceptron 460B of perceptrons 460B1-460BN. In one or more embodiments, perceptrons 460B1-460BN may receive data from perceptrons 460A1-460AN. For example, each perceptron 460B of perceptrons 460B1-460BN may receive data from each perceptron 460A of perceptrons 460A1-460AN. In one or more embodiments, a perceptron 460 may produce a single scalar value.

As illustrated, output data from perceptrons 460B1-460BN may be provided to perceptrons 462A and 462B. For example, each perceptron 460B of perceptrons 460B1-460BN may provide its output data to each perceptron 462 of perceptrons 462A and 462B. In one or more embodiments, perceptrons 462A and 462B may receive data from perceptrons 460B1-460BN. For example, each perceptron 462 of perceptrons 462A and 462B may receive data from each perceptron 460B of perceptrons 460B1-460BN.

In one or more embodiments, perceptrons 462A and 462B may provide output data. In one example, perceptron 462A may provide a confidence value that the audio produced by the information handling system includes a glitch. For instance, the confidence value that the audio produced by the information handling system includes the glitch may have a value from zero to one. As an example, if the confidence value that the audio produced by the information handling system includes the glitch is equal to or greater than 0.8, then it may be determined that he audio produced by the information handling system includes the glitch. In another example, perceptron 462B may provide a confidence value that the audio produced by the information handling system does not include a glitch. For instance, the confidence value that the audio produced by the information handling system does not include the glitch may have a value from zero to one. In one or more embodiments, a CNN may include filter 452A, pooling operation 456A, perceptrons 460A1-460AN, perceptrons 460B1-460BN, and/or perceptrons 462A and 462B, among others.

Figures 4E, 4F:
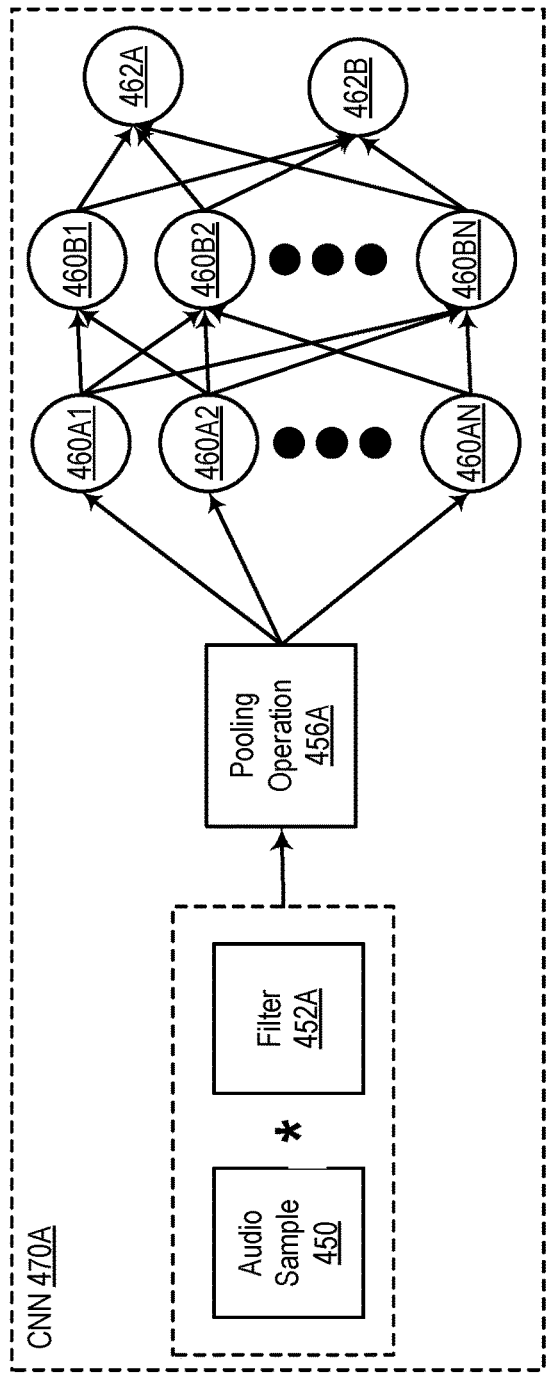
FIG. 4E illustrates an example of a convolution neural network, according to one or more embodiments.
FIG. 4F illustrates another example of a convolution, according to one or more embodiments.

Turning now to FIG. 4E, an example of a convolution neural network is illustrated, according to one or more embodiments. As shown, a CNN 470A may convolve audio sample 450 (e.g., audio produced by IHS 110) with filter 452A. For example, CNN 470A may receive audio sample 450. In one or more embodiments, CNN 470A may include instructions executable by processor 120 to implement at least a portion of one or more systems, one or more flowcharts, one or more methods, and/or one or more processes described herein. In one or more embodiments, CNN 470A may include data, utilizable by processor 120, to implement at least a portion of one or more systems, one or more flowcharts, one or more methods, and/or one or more processes described herein. As illustrated, output from convolving audio sample 450 with filter 452A may be provided to pooling operation 456A. For example, pooling operation 456A may be performed on a convolution of audio sample 450 with filter 452A. As shown, output from pooling operation 456A may be provided to perceptrons 460A1-460AN.

Turning now to FIG. 4F, another example of a convolution is illustrated, according to one or more embodiments. As shown, pooling output data 458A may be convolved with a filter 452B. In one or more embodiments, pooling output data 458A convolved with filter 452B may produce convolution output data 454B. In one or more embodiments, a second hidden layer may include perceptrons 460B1-460BN. In one or more embodiments, pooling operation 456B may include a max pooling operation, a min pooling operation, or an average pooling operation, among others.

Figure 4G:
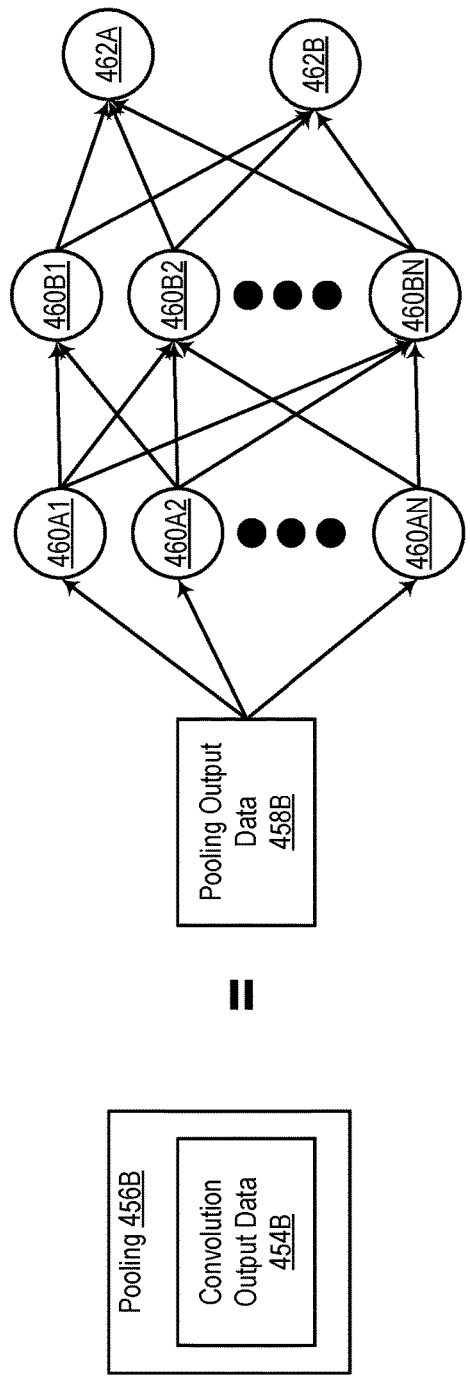
FIG. 4G illustrates another example of pooling and providing pooling output data to a fully connected neural network, according to one or more embodiments.

Turning now to FIG. 4G, another example of pooling and providing pooling output data to a fully connected neural network is illustrated, according to one or more embodiments. As shown, a pooling 456B of convolution output data 454B may produce pooling output data 456B. As illustrated, pooling output data 458B may be provided to perceptrons 460A1-460AN. In one or more embodiments, pooling output data 458B may include a vector. For example, the vector may be provided to perceptrons 460A1-460AN. For instance, the vector may be provided to each perceptron 460A of perceptrons 460A1-460AN. In one or more embodiments, perceptrons 460A1-460AN, perceptrons 460B1-460BN, and perceptrons 462A and 462B may operate as described with reference with FIG. 4D. In one or more embodiments, a CNN may include filter 452A, pooling operation 456A, filter 452B, pooling operation 456B, perceptrons 460A1-460AN, perceptrons 460B1-460BN, and/or perceptrons 462A and 462B, among others. In one or more embodiments, a second hidden layer may include perceptrons 460B1-460BN.

Figure 4H:
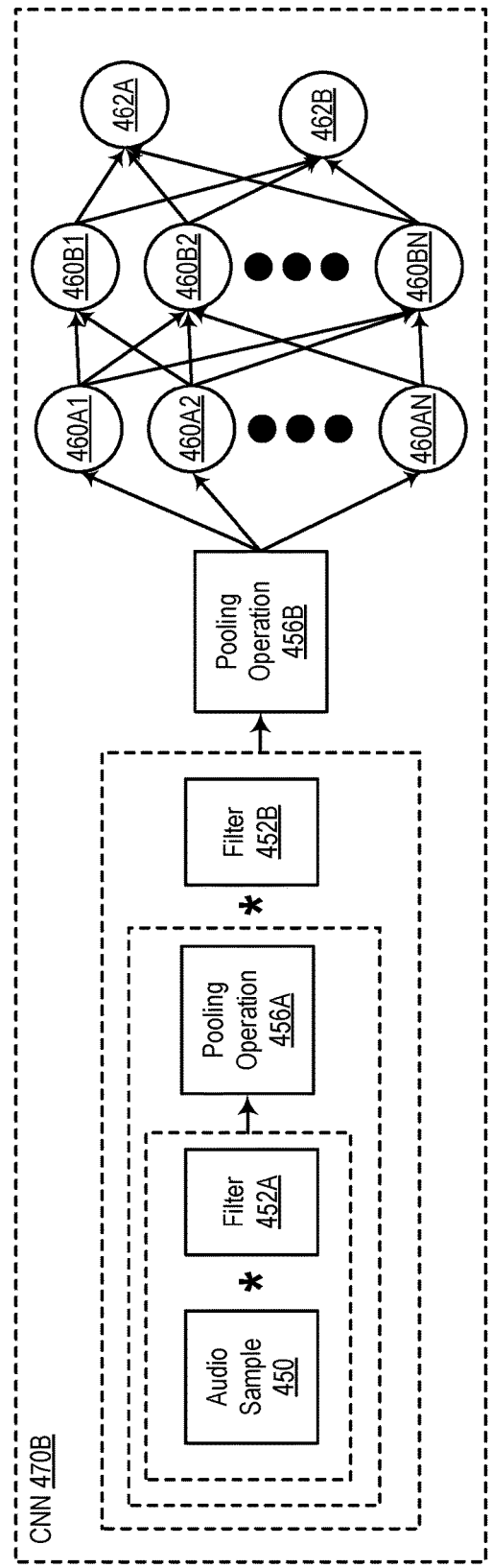
FIG. 4H illustrates another example of a convolution neural network, according to one or more embodiments.

Turning now to FIG. 4H, another example of a convolution neural network is illustrated, according to one or more embodiments. As shown, a CNN 470B may convolve audio sample 450 (e.g., audio produced by IHS 110) with filter 452A. For example, CNN 470B may receive audio sample 450. In one or more embodiments, CNN 470B may include instructions executable by processor 120 to implement at least a portion of one or more systems, one or more flowcharts, one or more methods, and/or one or more processes described herein. In one or more embodiments, CNN 470B may include data, utilizable by processor 120, to implement at least a portion of one or more systems, one or more flowcharts, one or more methods, and/or one or more processes described herein.

As illustrated, output from convolving audio sample 450 with filter 452A may be provided to pooling operation 456A. For example, pooling operation 456A may be performed on a convolution of audio sample 450 with filter 452A. As shown, output from pooling operation 456A may be convolved with filter 452B. As shown, output from convolving output from pooling operation 456A with filter 452B may be provided to pooling operation 456B. For example, pooling operation 456B may be performed on a convolution of output from pooling operation 456A with filter 452B. As illustrated, output from pooling operation 456B may be provided to perceptrons 460A1-460AN.

Figure 5A:
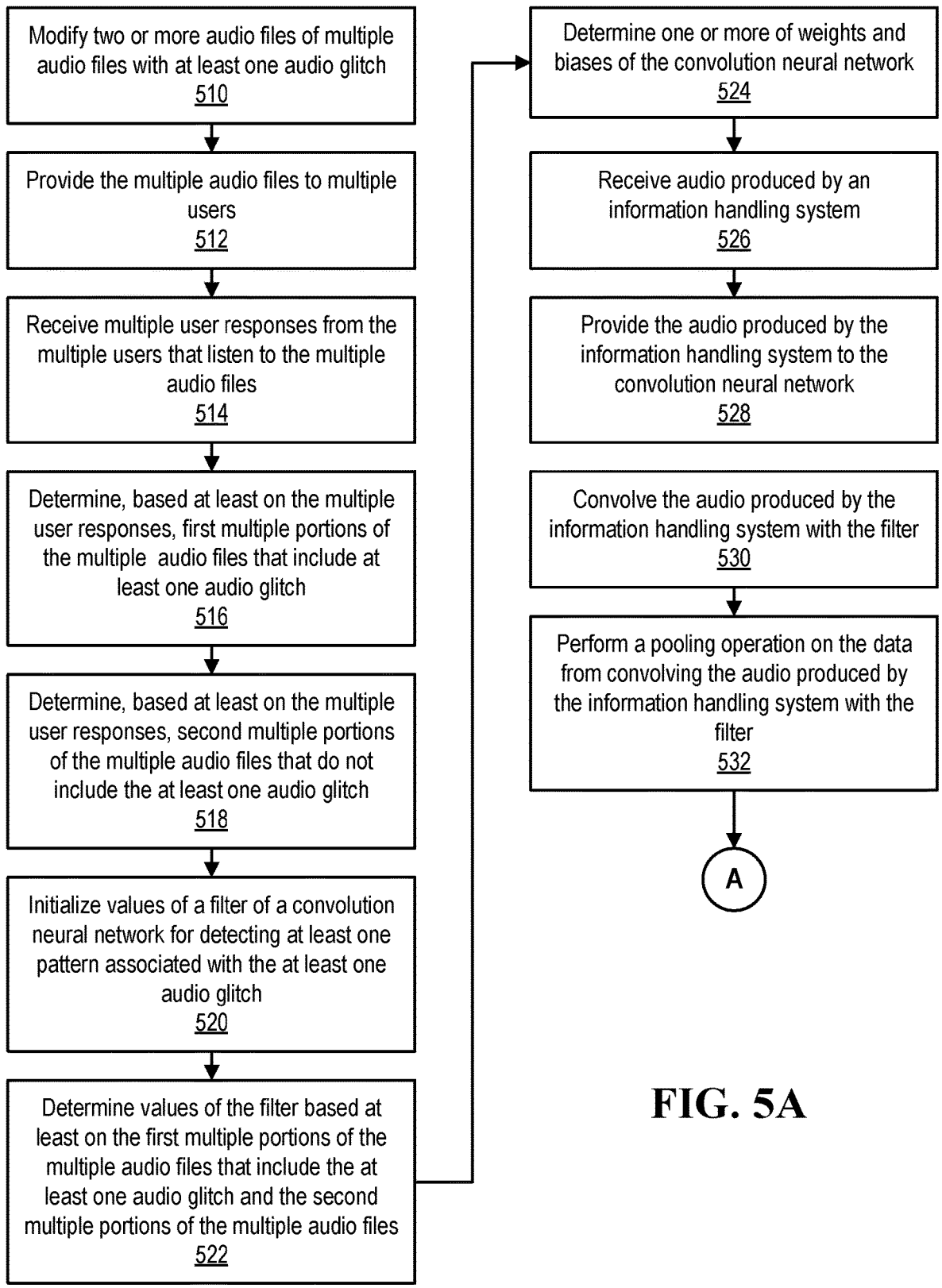
FIGS. 5A and 5B illustrate an example of operating a system, according to one or more embodiments.
Figure 5B:
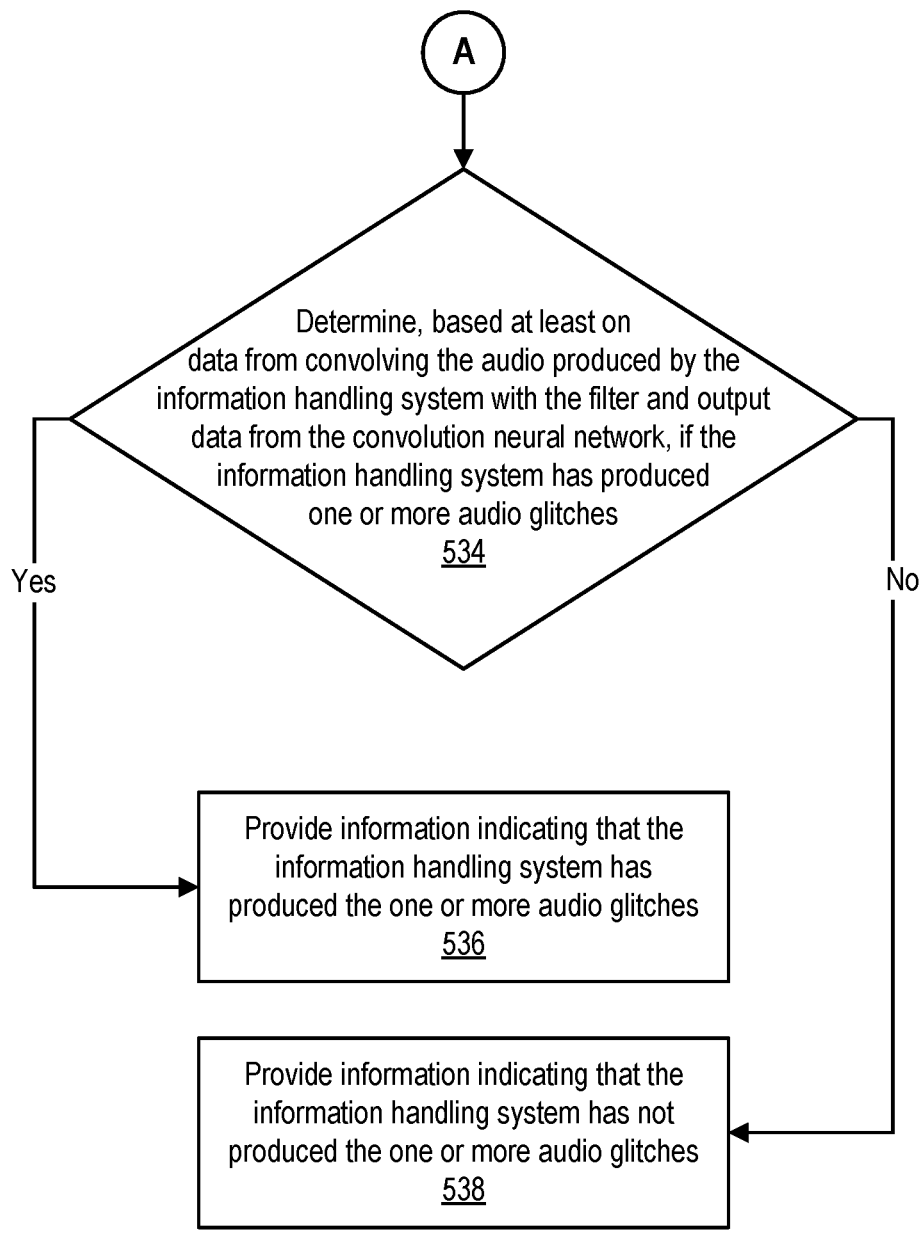

Turning now to FIGS. 5A and 5B, an example of operating a system is illustrated, according to one or more embodiments. At 510, at least one audio file of multiple audio files may be modified with at least one audio glitch. At 512, the multiple audio files may be provided to multiple users. For example, at least a first audio file of the multiple audio files may include at least one audio glitch and at least a second of audio file of the multiple audio files may not include any audio glitch. At 514, multiple user responses may be received from the multiple users that listen to the multiple audio files. For example, the multiple user responses from the multiple users that listen to the multiple audio files may be received via a user interface. For instance, the user interface may include a web interface.

At 516, first multiple portions of the multiple audio files that include at least one audio glitch may be determined based at least on the plurality of user responses. At 518, second multiple portions of the multiple audio files that do not include the at least one audio glitch may be determined based at least on the multiple user responses. At 520, values of a filter, of a convolution neural network, for detecting at least one pattern associated with the at least one audio glitch may be initialized. For example, values of filter 452A may be initialized. In one or more embodiments, a filter 452 may be or include a matrix of filter values. For example, each filter value $f_{ij}$ of a filter 452 may be determined.

At 522, values of a filter may be determined based at least on the first multiple portions of the multiple audio files that include the at least one audio glitch and the second multiple portions of the multiple audio files. At 524, one or more of weights and biases of the convolution neural network may be determined. In one example, determining the one or more of weights and biases of the convolution neural network may include utilizing a gradient descent process. In a second example, determining the one or more of weights and biases of the convolution neural network may include utilizing a gradient descent with momentum process. In another example, determining the one or more of weights and biases of the convolution neural network may include utilizing a backwards propagation process.

At 526, audio produced by an information handling system may be received. For example, audio produced by an information handling system being tested may be received. At 528, the audio produced by the information handling system may be provided to the convolution neural network. For example, the audio produced by the information handling system may be provided to CNN 470. At 530, the audio produced by the information handling system may be convolved with the filter. At 532, a pooling operation may be performed on the data from convolving the audio produced by the information handling system with the filter. For example, the pooling operation may include a max pooling operation, a min pooling operation, or an average pooling operation. At 534, it may be determined, based at least on data from convolving the audio produced by the information handling system with the filter and output data from the convolution neural network, if the information handling system has produced one or more audio glitches.

If the information handling system has produced one or more audio glitches, information indicating that the information handling system has produced the one or more audio glitches may be provided, at 536. In one or more embodiments, providing information indicating that the information handling system has produced the one or more audio glitches may include providing information indicating that the information handling system has produced the one or more audio glitches to another information handling system. In one or more embodiments, providing information indicating that the information handling system has produced the one or more audio glitches may include providing information indicating that the information handling system has produced the one or more audio glitches to a display of the information handling system.

If the information handling system has not produced one or more audio glitches, information indicating that the information handling system has not produced the one or more audio glitches may be provided, at 538. In one or more embodiments, providing information indicating that the information handling system has not produced the one or more audio glitches may include providing information indicating that the information handling system has not produced the one or more audio glitches to another information handling system. In one or more embodiments, providing information indicating that the information handling system has not produced the one or more audio glitches may include providing information indicating that the information handling system has not produced the one or more audio glitches to a display of the information handling system.

Figure 6:
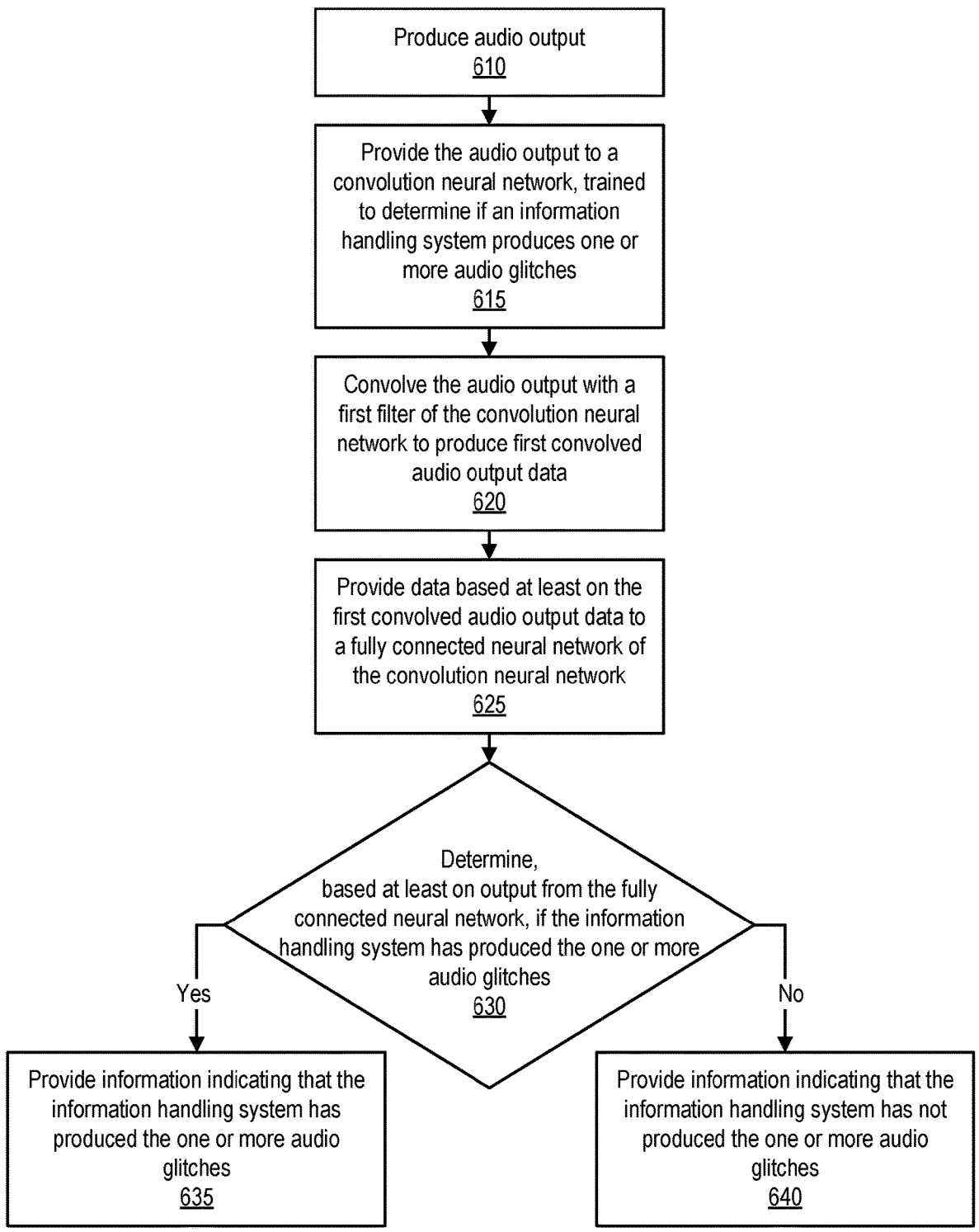
FIG. 6 illustrates another example of determining if an information handling system produces an audio glitch, according to one or more embodiments.

Turning now to FIG. 6, an example of determining if an information handling system produces an audio glitch is illustrated, according to one or more embodiments. At 610, audio output may be produced. For example, IHS 110 may produce audio output. For instance, IHS 110 may produce audio sample 450. At 615, the audio output may be provided to a convolution neural network trained to determine if an information handling system produces one or more audio glitches. For example, audio sample 450 may be provided to CNN 470. For instance, IHS 110 may provide audio sample 450 to CNN 470. In one or more embodiments, CNN 470 may receive audio sample 450. In one or more embodiments, IHS 110 may store CNN 470 via one or more of memory media 150, 160, and 170, among others. In one or more embodiments, the convolution neural network trained to determine if the information handling system produces the one or more audio glitches before the audio output is provided to the convolution neural network.

At 620, the audio output may be convolved with a first filter of the convolution neural network to produce first convolved audio output data. In one example, IHS 110 may convolve the audio output with a first filter of the convolution neural network to produce first convolved audio output data. In another example, CNN 470 may convolve the audio output with a first filter of the convolution neural network to produce first convolved audio output data. In one or more embodiments, the first filter may be configured to determine that a change in magnitude of sounds is above a threshold in a period of time.

At 625, data based at least on the first convolved audio output data may be provided to a fully connected neural network of the convolution neural network. In one example, IHS 110 may provide data based at least on the first convolved audio output data to a fully connected neural network of the convolution neural network. In another example, CNN 470 may provide data based at least on the first convolved audio output data to a fully connected neural network of CNN 470. For instance, the fully connected neural network of CNN 470 may include perceptrons 460A1-460AN, perceptrons 460B1-460BN, and perceptrons 462A and 462B.

At 630, it may be determined, based at least on output from the fully connected neural network, if the information handling system has produced the one or more audio glitches. In one or more embodiments, determining, based at least on output from the fully connected neural network, if the information handling system has produced one or more audio glitches may include determining if an output value of the fully connected neural network is at or above a threshold value. For example, determining if the output value of the fully connected neural network is at or above the threshold value may include determining if an output value of perceptron 462A is at or above the threshold value. For instance, the output value of perceptron 462A may be or include a confidence value. As an example, the threshold value may be 0.8.

If the information handling system has produced one or more audio glitches, information indicating that the information handling system has produced the one or more audio glitches may be provided, at 635. In one or more embodiments, providing information indicating that the information handling system has produced the one or more audio glitches may include providing information indicating that the information handling system has produced the one or more audio glitches to another information handling system. In one or more embodiments, providing information indicating that the information handling system has produced the one or more audio glitches may include providing information indicating that the information handling system has produced the one or more audio glitches to a display of the information handling system.

If the information handling system has not produced one or more audio glitches, information indicating that the information handling system has not produced the one or more audio glitches may be provided, at 640. In one or more embodiments, providing information indicating that the information handling system has not produced the one or more audio glitches may include providing information indicating that the information handling system has not produced the one or more audio glitches to another information handling system. In one or more embodiments, providing information indicating that the information handling system has not produced the one or more audio glitches may include providing information indicating that the information handling system has not produced the one or more audio glitches to a display of the information handling system.

In one or more embodiments, a max pooling operation may be performed on the first convolved audio output data. For example, providing the data based at least on the first convolved audio output data to the fully connected neural network of the convolution neural network may include providing data from the max pooling operation to the fully connected neural network of the convolution neural network. In one or more embodiments, a first max pooling operation may be performed on the convolved audio output data. For example, providing the data based at least on the convolved audio output data to the fully connected neural network of the convolution neural network may include providing data from the max pooling operation to the fully connected neural network of the convolution neural network. In one or more embodiments, output from the first pooling operation may be convolved with a second filter to produce second convolved output data. For example, the data based at least on the first convolved audio output data may be further based on the second convolved output data.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
  at least one processor; and
  a memory medium, coupled to the at least one processor, that stores instructions executable by the at least one processor, which when executed by the at least one processor, cause the system to:
    provide, to a plurality of users, a plurality of audio files, wherein at least a first audio file of the plurality of audio files includes at least one audio glitch and at least a second of audio file of the plurality of audio files does not include any audio glitch;
    receive a plurality of user responses from the plurality of users that listen to the plurality of audio files;
    determine, based at least on the plurality of user responses, a first plurality of portions of the plurality of audio files that include at least one audio glitch;
    determine, based at least on the plurality of user responses, a second plurality of portions of the plurality of audio files that do not include the at least one audio glitch;
    initialize values of a filter of a convolution neural network for detecting at least one pattern associated with the at least one audio glitch;
    determine values of the filter based at least on the first plurality of portions of the plurality of audio files that include the at least one audio glitch and the second plurality of portions of the plurality of audio files;
    receive audio produced by an information handling system;
    provide the audio produced by the information handling system to the convolution neural network;
    convolve the audio produced by the information handling system with the filter;
    determine, based at least on data from convolving the audio produced by the information handling system with the filter and output data from the convolution neural network, if the information handling system has produced one or more audio glitches;
    if the information handling system has produced one or more audio glitches, provide information indicating that the information handling system has produced the one or more audio glitches; and
    if the information handling system has not produced one or more audio glitches, provide information indicating that the information handling system has not produced the one or more audio glitches.

2. The system of claim 1,
  wherein the instructions further cause the system to perform a pooling operation on the data from convolving the audio produced by the information handling system with the filter; and
  wherein, to determine, based at least on the data from convolving the audio produced by the information handling system with the filter and the output data from the convolution neural network, if the information handling system has produced the one or more audio glitches, the instructions further cause the system to determine, based at least on output data from the pooling operation and the output data from the convolution neural network, if the information handling system has produced the one or more audio glitches.

3. The system of claim 2, wherein the pooling operation includes a max pooling operation, a min pooling operation, or an average pooling operation.

4. The system of claim 1,
wherein the instructions further cause the system to determine one or more of weights and biases of the convolution neural network; and
wherein the output data from the convolution neural network is based at least on the one or more of weights and biases of the convolution neural network.

5. The system of claim 4, wherein, to determine the one or more of weights and biases of the convolution neural network, the instructions further cause the system to determine the one or more of weights and biases of the convolution neural network via a gradient descent process or a backwards propagation process.

6. The system of claim 1, wherein the filter is configured to determine the at least one pattern that includes a change in magnitude of sound that is above a threshold in a period of time, which indicates at least one of the one or more audio glitches.

7. The system of claim 1,
wherein the at least one audio glitch includes a first audio glitch; and
wherein, to determine if the information handling system has produced the one or more audio glitches, the instructions further cause the system to determine, via the convolution neural network, that the audio produced by the information handling system includes a second audio glitch, different from the first audio glitch.

8. A method, comprising:
providing, to a plurality of users, a plurality of audio files, wherein at least a first audio file of the plurality of audio files includes at least one audio glitch and at least a second of audio file of the plurality of audio files does not include any audio glitch;
receiving a plurality of user responses from the plurality of users that listen to the plurality of audio files;
determining, based at least on the plurality of user responses, a first plurality of portions of the plurality of audio files that include at least one audio glitch;
determining, based at least on the plurality of user responses, a second plurality of portions of the plurality of audio files that do not include the at least one audio glitch;
initializing values of a filter of a convolution neural network for detecting at least one pattern associated with the at least one audio glitch;
determining values of the filter based at least on the first plurality of portions of the plurality of audio files that include the at least one audio glitch and the second plurality of portions of the plurality of audio files;
receiving audio produced by an information handling system;
providing the audio produced by the information handling system to the convolution neural network;
convolving the audio produced by the information handling system with the filter;
determining, based at least on data from convolving the audio produced by the information handling system with the filter and output data from the convolution neural network, if the information handling system has produced one or more audio glitches;
if the information handling system has produced one or more audio glitches, providing information indicating that the information handling system has produced the one or more audio glitches; and
if the information handling system has not produced one or more audio glitches, providing information indicating that the information handling system has not produced the one or more audio glitches.

9. The method of claim 8, further comprising:
performing a pooling operation on the data from convolving the audio produced by the information handling system with the filter;
wherein the determining, based at least on the data from convolving the audio produced by the information handling system with the filter and the output data from the convolution neural network, if the information handling system has produced the one or more audio glitches includes determining, based at least on output data from the pooling operation and the output data from the convolution neural network, if the information handling system has produced the one or more audio glitches.

10. The method of claim 9, wherein the pooling operation includes a max pooling operation, a min pooling operation, or an average pooling operation.

11. The method of claim 8, further comprising:
determining one or more of weights and biases of the convolution neural network;
wherein the output data from the convolution neural network is based at least on the one or more of weights and biases of the convolution neural network.

12. The method of claim 11, wherein the determining the one or more of weights and biases of the convolution neural network includes determining the one or more of weights and biases of the convolution neural network via a gradient descent process or a backwards propagation process.

13. The method of claim 8, wherein the filter is configured to determine the at least one pattern that includes a change in magnitude of sound that is above a threshold in a period of time, which indicates at least one of the one or more audio glitches.

14. The method of claim 8,
wherein the at least one audio glitch includes a first audio glitch; and
wherein the determining if the information handling system has produced the one or more audio glitches includes determining, via the convolution neural network, that the audio produced by the information handling system includes a second audio glitch, different from the first audio glitch.

15. An information handling system, comprising:
at least one processor; and
a memory medium, coupled to the at least one processor, that stores instructions executable by the at least one processor, which when executed by the at least one processor, cause the information handling system to:
produce audio output;
provide the audio output to a convolution neural network, stored by the memory medium, trained to determine if the information handling system has produced one or more audio glitches;
convolve the audio output with a first filter of the convolution neural network to produce first convolved audio output data, wherein the first filter is configured to determine that a change in magnitude of sounds is above a threshold in a period of time;
provide data based at least on the first convolved audio output data to a fully connected neural network of the convolution neural network;
determine, based at least on output from the fully connected neural network, if the information handling system produces the one or more audio glitches;

if the information handling system has produced one or more audio glitches, provide information indicating that the information handling system has produced the one or more audio glitches; and if the information handling system has not produced one or more audio glitches, provide information indicating that the information handling system has not produced the one or more audio glitches.

16. The information handling system of claim 15,
wherein the instructions further cause the information handling system to perform a max pooling operation on the first convolved audio output data; and wherein, to provide the data based at least on the first convolved audio output data to the fully connected neural network of the convolution neural network, the instructions further cause the information handling system to provide data from the max pooling operation to the fully connected neural network of the convolution neural network.

17. The information handling system of claim 15, wherein, to determine, based at least on output from the fully connected neural network, if the information handling system has produced one or more audio glitches, the instructions further cause the information handling system to determine if an output value of the fully connected neural network is at or above a threshold value.

18. The information handling system of claim 15,
wherein the instructions further cause the information handling system to:
perform a first pooling operation on the first convolved audio output data; and
convolve output from the first pooling operation with a second filter to produce second convolved output data; and
wherein the data based at least on the first convolved audio output data is further based on the second convolved output data.

19. The information handling system of claim 18,
wherein the instructions further cause the information handling system to:
perform a second pooling operation on the second convolved output data; and
wherein the data based at least on the first convolved audio output data is further based on output from the second pooling operation.

\* \* \* \* \*